(12) United States Patent
Jun et al.

(10) Patent No.: US 12,483,786 B2
(45) Date of Patent: Nov. 25, 2025

(54) APPARATUS AND METHOD FOR CONTROLLING OPTICAL IMAGE STABILIZATION (OIS) USING LOW-POWER PROCESSOR

(71) Applicant: Samsung Electronics Co., Ltd., Suwon-si (KR)

(72) Inventors: Intae Jun, Suwon-si (KR); Daeho Kim, Suwon-si (KR); Daehwan Lee, Suwon-si (KR); Kyungwan Han, Suwon-si (KR); Byoungjun Kim, Suwon-si (KR); Yeonhak Kim, Suwon-si (KR); Gunhee Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 18/187,315

(22) Filed: Mar. 21, 2023

(65) Prior Publication Data

US 2023/0379580 A1 Nov. 23, 2023

Related U.S. Application Data

(63) Continuation of application No. PCT/KR2023/002205, filed on Feb. 15, 2023.

(30) Foreign Application Priority Data

May 20, 2022 (KR) .................. 10-2022-0062188
Jul. 18, 2022 (KR) .................. 10-2022-0088518

(51) Int. Cl.
*H04N 23/68* (2023.01)

(52) U.S. Cl.
CPC ....... *H04N 23/683* (2023.01); *H04N 23/6812* (2023.01); *H04N 23/687* (2023.01)

(58) Field of Classification Search
CPC ............ H04N 23/683; H04N 23/6812; H04N 23/687; H04N 23/65; H04N 23/68; H04N 23/651; H04N 23/667
See application file for complete search history.

(56) References Cited

U.S. PATENT DOCUMENTS 9,185,292 B2  11/2015 Kang
9,596,411 B2  3/2017 Thivent et al.
(Continued)

FOREIGN PATENT DOCUMENTS

KR  10-2007-0035799 A  4/2007
KR    10-0705929 B1  4/2007
(Continued)

OTHER PUBLICATIONS

International Search Report dated May 23, 2023, issued in International Patent Application No. PCT/KR2023/002205.
(Continued)

*Primary Examiner* — Nhan T Tran
(74) *Attorney, Agent, or Firm* — Jefferson IP Law, LLP

(57) ABSTRACT

An apparatus and a method for providing image stabilization (IS) using a low-power processor are provided. The method includes an IS control instruction group in a memory using a general-purpose processor when a camera operates, initialize based on the IS control instruction group, drive a polling timer included in the low-power processor so that IS may be performed at a preset interval based on the IS control instruction group, and correct a shake through the low-power processor based on the IS control instruction group.

21 Claims, 9 Drawing Sheets

(56) References Cited

U.S. PATENT DOCUMENTS

| | | | |
|---|---|---|---|
| 9,628,713 | B2 | 4/2017 | Lloyd et al. |
| 9,699,382 | B2 | 7/2017 | Kim et al. |
| 9,794,482 | B2 | 10/2017 | Youm |
| 9,892,084 | B2 | 2/2018 | Whitby-Strevens et al. |
| 10,038,850 | B2 | 7/2018 | Karttunen et al. |
| 10,681,277 | B1 | 6/2020 | Kulik et al. |
| 10,812,716 | B2 * | 10/2020 | Kim .................. H04N 23/667 |
| 10,999,507 | B2 | 5/2021 | Kulik et al. |
| 11,102,416 | B2 | 8/2021 | Sharma et al. |
| 2005/0168586 | A1 * | 8/2005 | Tsubusaki ............ H04N 23/687 |
| | | | 348/208.99 |
| 2012/0026348 | A1 | 2/2012 | Yun et al. |
| 2014/0168454 | A1 | 6/2014 | Lin et al. |
| 2016/0173783 | A1 * | 6/2016 | Kim .................. H04N 23/651 |
| | | | 348/208.11 |
| 2020/0137309 | A1 | 4/2020 | Kulik et al. |
| 2020/0272308 | A1 * | 8/2020 | Fang .................. G06F 3/04815 |
| 2020/0288061 | A1 * | 9/2020 | Grenet ................ H04N 23/684 |

FOREIGN PATENT DOCUMENTS

| | | |
|---|---|---|
| KR | 10-0819301 B1 | 4/2008 |
| KR | 10-1361945 B1 | 2/2014 |
| KR | 10-2017-0141052 A | 12/2017 |
| KR | 10-1889702 B1 | 8/2018 |
| KR | 10-1892857 B1 | 8/2018 |
| KR | 10-2019-0097786 A | 8/2019 |
| KR | 10-1983179 B1 | 8/2019 |
| KR | 10-2021-0024053 A | 3/2021 |
| KR | 10-2021-0127409 A | 10/2021 |
| KR | 10-2021-0152203 A | 12/2021 |

OTHER PUBLICATIONS

Extended European Search Report dated Apr. 22, 2025; European Appln. No. 23807741.6 - 1207 / 4456547 PCT/KR2023002205.

* cited by examiner

APPARATUS AND METHOD FOR CONTROLLING OPTICAL IMAGE STABILIZATION (OIS) USING LOW-POWER PROCESSOR

CROSS-REFERENCE TO RELATED APPLICATION(S)

This application is a continuation application, claiming priority under § 365(c), of an International Application No. PCT/KR2023/002205, filed on Feb. 15, 2023, which is based on and claims the benefit of a Korean patent application number 10-2022-0062188, filed on May 20, 2022, in the Korean Intellectual Property Office, and of a Korean patent application number 10-2022-0088518, filed on Jul. 18, 2022, in the Korean Intellectual Property Office, the disclosure of each of which is incorporated by reference herein in its entirety.

BACKGROUND

1. Field

The disclosure relates to technology for controlling optical image stabilization (OIS) of a camera using a low-power processor that controls a sensor, instead of a separate image stabilization (IS) processor.

2. Description of Related Art

The development of electronic technology has accelerated the development and distribution of electronic products of various types. In particular, the spread of electronic devices having various functions, for example, smartphones and tablet personal computers (PCs), has recently expanded.

When a user captures an image using an electronic device, an image quality deterioration such as image blurring may occur due to slight shaking or other small vibrations (e.g., in transportation driven on an uneven road surface). Electronic devices with an image stabilization (IS) function are being developed to prevent deterioration of the quality of an image captured using a camera.

The IS function applied to the electronic devices detects a motion caused by a shake using a motion sensor and performs IS by moving a lens opposite to the motion caused by the shake.

For such IS, the electronic devices include a separate IS processor for controlling IS.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for providing image stabilization (IS) using a low-power processor for controlling a sensor, instead of a separate IS processor.

Additional aspects will be set forth in part in the description which follows and, in part, will be apparent from the description, or may be learned by practice of the presented embodiments.

In accordance with an aspect of the disclosure, an optical image stabilization (OIS) method is provided. The OIS method includes storing an IS control instruction group in a memory using a general-purpose processor when an anti-shake start event occurs, driving a polling timer to perform IS at a preset interval by executing a polling timer instruction included in the IS control instruction group using a low-power processor, and correcting a shake of a camera based on the IS control instruction group, using the low-power processor.

In accordance with another aspect of the disclosure, an OIS apparatus is provided. The OIS apparatus includes a camera including an IS driver configured to correct a shake according to an IS result, a motion sensor configured to sense a motion and output user interface (UI) motion information and IS motion information, a memory, and a mobile processor including a general-purpose processor and a low-power processor, wherein the general-purpose processor may be configured to store an IS control instruction group in the memory when an anti-shake start event occurs, and the low-power processor may be configured to drive a polling timer to perform IS at a preset interval by executing an instruction included in the IS control instruction group stored in the memory, obtain the IS motion information, generate the IS result according to the IS motion information, and provide the IS result to the IS driver.

According to an embodiment, an OIS apparatus includes a camera including an IS driver configured to correct a shake according to an IS result, a motion sensor configured to sense a motion and output motion information, a memory, and a mobile processor including a general-purpose processor and a low-power processor, the general-purpose processor may be configured to store an IS control instruction group in the memory when an anti-shake start event occurs, and the low-power processor may be configured to drive a polling timer to perform IS at a preset interval by executing an instruction included in the IS control instruction group stored in the memory, obtain the motion information, generate the IS result according to the motion information, and provide the IS result to the IS driver.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
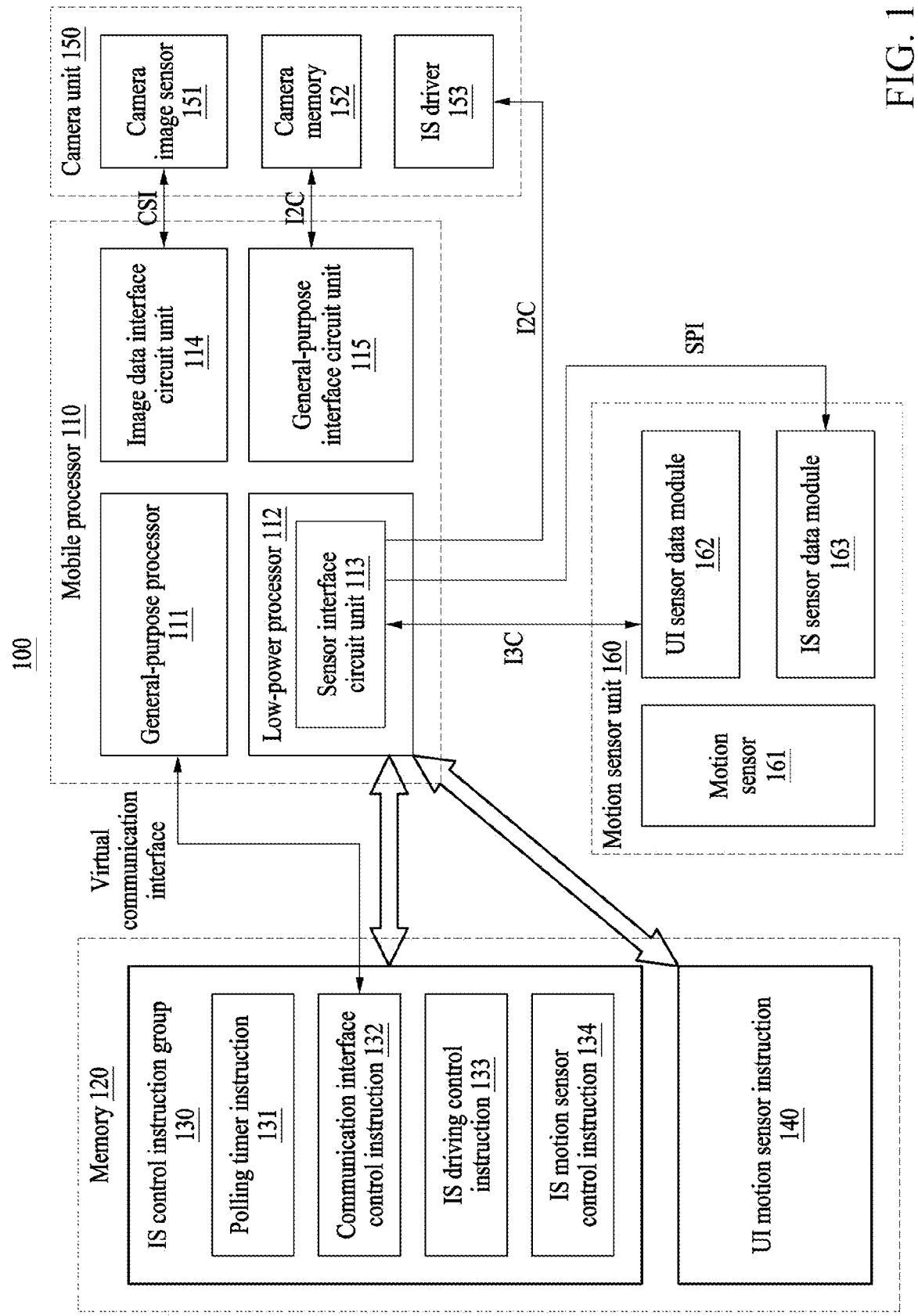
FIG. 1 is a diagram illustrating a configuration of an electronic device for controlling optical image stabilization (OIS) of a camera using a 2-channel motion sensor and an image stabilization (IS) control instruction group according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminology used herein is for the purpose of describing particular embodiments only and is not to be limiting of the embodiments. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the disclosure.

Also, in the description of the components, terms such as first, second, A, B, (a), (b) or the like may be used herein when describing components of the disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the embodiments described above and an element having a common function. Unless otherwise mentioned, the descriptions of the examples may be applicable to the following examples and thus, duplicated descriptions will be omitted for conciseness.

Hereinafter, an apparatus and method for providing image stabilization (IS) using a low-power processor according to an embodiment of the disclosure will be described in detail with reference to FIGS. 1 to 8 attached thereto.

FIG. 1 is a diagram illustrating a configuration of an electronic device for controlling optical image stabilization (OIS) of a camera using a 2-channel motion sensor and an IS control instruction group according to an embodiment of the disclosure.

Referring to FIG. 1, an electronic device 100 may include a mobile processor 110, a memory 120, a camera unit 150, and a motion sensor unit 160.

The mobile processor 110 may include a general-purpose processor 111, a low-power processor 112, an image data interface circuit unit 114, and a general-purpose interface circuit unit 115.

The general-purpose processor 111 may correspond to a central processing unit or an application processor, and may execute software to control at least one of the other components of the electronic device 100 and perform a variety of data processing or operations. The general-purpose processor 111 may include multiple cores.

In a case in which an anti-shake start event occurs, the general-purpose processor 111 may store an IS control instruction group 130 in the memory 120. In a case in which an anti-shake end event occurs, the general-purpose processor 111 may delete the IS control instruction group 130 from the memory 120.

In this case, the anti-shake start event may occur immediately before the camera unit 150 operates as a camera app is executed. However, embodiments are not limited thereto, and the anti-shake start event may occur when the camera app is executed or when the camera unit 150 starts to operate. In addition, the anti-shake end event may occur immediately before the operation of the camera unit 150 stops as the camera app ends. However, embodiments are not limited thereto, and the anti-shake end event may occur in a case in which the camera app ends or when the operation of the camera unit 150 ceases.

The low-power processor 112 may use less power than the general-purpose processor 111 or may be set to be specialized for a designated function. In FIG. 1, the low-power processor 112 may operate as a sensor hub processor for controlling at least one sensor. The low-power processor 112 may include one core. The low-power processor 112 may provide computation capability to the IS control instruction group 130.

The image data interface circuit unit 114 may provide communication with the camera unit 150, and the general-purpose interface circuit unit 115 may provide communication with peripheral devices of the electronic device 100.

The camera unit 150 may include a camera image sensor 151, a camera memory 152, and an IS driver 153.

The camera image sensor 151 may acquire an image by receiving light.

The camera image sensor 151 may be connected to the image data interface circuit unit 114 via a camera serial interface (CSI) channel to provide the acquired image to the general-purpose processor 111 through the image data interface circuit unit 114.

The camera memory 152 may store an IS adjustment value for calibrating the IS driver 153.

Upon receiving an IS result, the IS driver 153 may correct a shake of the camera unit 150 by physically adjusting at least one lens (not shown).

The motion sensor unit 160 may sense a motion of the electronic device 100 and output user interface (UI) motion information and IS motion information.

The motion sensor unit 160 may output the UI motion information and the IS motion information through different communication channels.

More specifically, the motion sensor unit 160 may include a motion sensor 161, a UI sensor data module 162, and an IS sensor data module 163.

The motion sensor 161 may be an element configured to sense the motion of the electronic device 100 and output the sensed motion information as sensor data, and may include a 6-axis sensor with a 3-axis gyroscope and a 3-axis accelerometer.

The UI sensor data module 162 may process sensor data corresponding to a UI among the sensor data sensed by the motion sensor 161 into the UI motion information and provide the UI motion information to the sensor interface circuit unit 113 of the low-power processor 112. In this case, the UI motion information may be transmitted through an I3C interface connected between the UI sensor data module 162 and the sensor interface circuit unit 113.

The IS sensor data module 163 may process sensor data corresponding to a shake among the sensor data sensed by the motion sensor 161 into IS motion information and provide the IS motion information to the sensor interface circuit unit 113 of the low-power processor 112. In this case, the IS motion information may be transmitted through a serial peripheral interface (SPI) connected between the IS sensor data module 163 and the sensor interface circuit unit 113.

The memory 120 may store an operating system for controlling the overall operation of the electronic device 100, application programs, and data for storage (e.g., phone numbers, short messaging service (SMS) messages, compressed image files, videos, etc.). Further, the memory 120 may store the IS control instruction group 130 and a UI motion sensor instruction 140, using the general-purpose processor 111 according to the disclosure.

The low-power processor 112 may drive a polling timer to perform IS at a preset interval by executing an instruction included in the IS control instruction group 130, obtain the IS motion information, generate the IS result according to the IS motion information, and provide the IS result to the IS driver 153.

More specifically, the IS control instruction group 130 may include a polling timer instruction 131, a communication interface control instruction 132, an IS driving control instruction 133, and an IS motion sensor control instruction 134.

The polling timer instruction 131 may be an element configured to perform IS at a preset interval, and may be an instruction for verifying whether the preset interval expires in a case in which an anti-shake end event does not occur after correcting the shake.

The polling timer instruction 131 may be an instruction for restarting the preset interval in a case in which the preset interval expires.

The polling timer instruction 131 may be an instruction for waiting for a preset time until the preset interval expires in a case in which the preset interval does not expire.

The polling timer using the polling timer instruction 131 of the disclosure may be a software timer rather than a physical timer.

Conventional software timers have been mostly used to process user-based daily operations and thus, may be designed and used at the level of milliseconds (msec).

However, the software timers designed at the level of msec have a large error range and may thus not be suitable for performing time-sensitive operations such as OIS algorithms, such as devices for controlling OIS.

The disclosure may provide a polling timer at the level of nanoseconds, which are the minimum unit of a hardware (HW) tick counter of the low-power processor 112, thereby maximizing the accuracy.

However, running the timer while polling the polling timer every nanosecond may be a burden to the low-power processor 112, and thus, a scaling factor may be used dynamically.

For example, in a case in which the IS algorithm ends before 1 msec, the polling timer is caused to expire quickly with an intentional delay of tens of microseconds (μsec), and when the expiration point is almost reached, the polling timer maintains the previous accuracy as it is by conversion to the unit of nanoseconds.

The communication interface control instruction 132 may be an instruction for connecting a first virtual communication interface between the memory 120 and the general-purpose processor 111 to receive an IS adjustment value. In this case, the first virtual communication interface may be a virtual communication interface mimicking the operation of an inter-integrated circuit (I2C) interface.

In addition, the communication interface control instruction 132 may be an instruction for connecting a second virtual communication interface between the memory 120 and the general-purpose processor 111 to obtain information for setting an IS strength according to an ambient illumination using the general-purpose processor 111, in a case in which a video exclusive image quality correction mode is executed in a video shooting mode, verifying the IS strength based on the information for setting the IS strength, and providing the IS strength to the low-power processor 112 that executes the IS driving control instruction 133. In this case, the second virtual communication interface may be a virtual communication interface mimicking the operation of an I2C interface.

The IS motion sensor control instruction 134 may be an instruction for obtaining the IS motion information from the motion sensor unit 160 through the sensor interface circuit unit 113 of the low-power processor 112 using the low-power processor 112.

The IS driving control instruction 133 may be an instruction for receiving the IS adjustment value stored in the camera unit 150 through the first virtual communication interface using the general-purpose processor 111, initializing IS based on the IS adjustment value using the low-power processor 112, generating the IS result corresponding to the IS motion information by executing an IS algorithm using the low-power processor 112, and providing the IS result to the IS driver 153 through the sensor interface circuit unit 113 using the low-power processor 112. The initialization by the IS driving control instruction 133 may be to perform calibration using the IS adjustment value when executing the IS algorithm.

The IS driving control instruction 133 may be an instruction for generating the IS in consideration of the IS strength in generating the IS result, in a case in which a video exclusive image quality correction mode is executed in a video shooting mode.

Meanwhile, the IS control instruction group 130 is shown as being divided into the polling timer instruction 131, the communication interface control instruction 132, the IS driving control instruction 133, and the IS motion sensor control instruction 134 to describe their functions separately.

Figure 2:
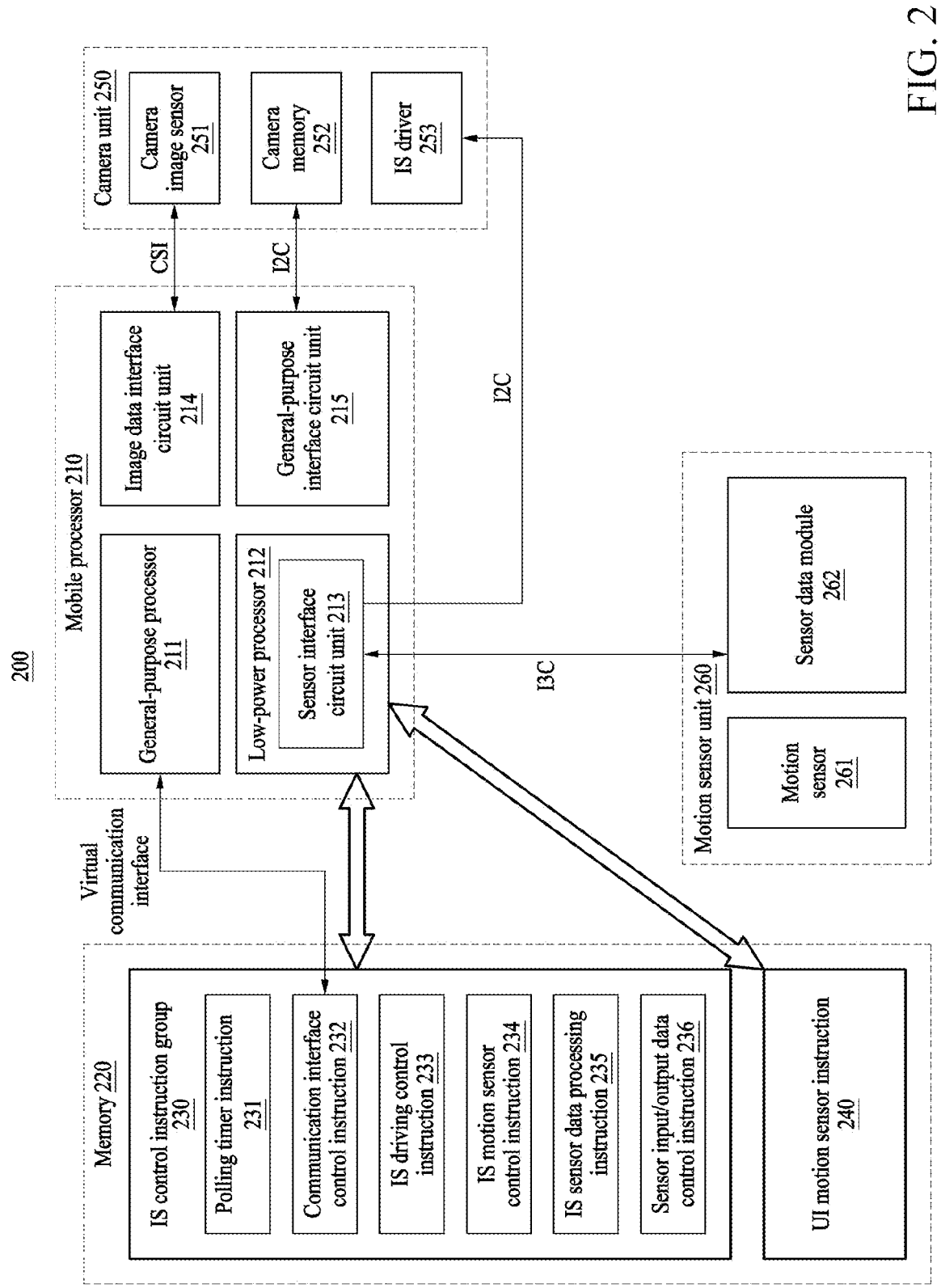
FIG. 2 is a diagram illustrating a configuration of an electronic device for controlling OIS of a camera using a 1-channel motion sensor and an IS control instruction group according to an embodiment of the disclosure.

FIG. 2 is a diagram illustrating a configuration of an electronic device for controlling OIS of a camera using a 1-channel motion sensor and an IS control instruction group according to an embodiment of the disclosure.

Referring to FIG. 2, an electronic device 200 may include a mobile processor 210, a memory 220, a camera unit 250, and a motion sensor unit 260.

The mobile processor 210 may include a general-purpose processor 211, a low-power processor 212, an image data interface circuit unit 214, and a general-purpose interface circuit unit 215.

The general-purpose processor 211 may correspond to a central processing unit or an application processor, and may execute software to control at least one of the other components of the electronic device 200 and perform a variety of data processing or operations. The general-purpose processor 211 may include multiple cores.

In a case in which an anti-shake start event occurs, the general-purpose processor 211 may store an IS control instruction group 230 in the memory 220. In a case in which an anti-shake end event occurs, the general-purpose processor 211 may delete the IS control instruction group 230 from the memory 220.

In this case, the anti-shake start event may occur immediately before the camera unit 150 operates as a camera app is executed. However, embodiments are not limited thereto, and the anti-shake start event may occur when the camera app is executed or when the camera unit 150 starts to operate. In addition, the anti-shake end event may occur immediately before the operation of the camera unit 150 stops as the camera app ends. However, embodiments are not limited thereto, and the anti-shake end event may occur in a case in which the camera app ends or in a case in which the operation of the camera unit 150 ceases.

The low-power processor 212 may use less power than the general-purpose processor 211 or may be set to be specialized for a designated function. In FIG. 2, the low-power processor 212 may operate as a sensor hub processor for controlling sensors. The low-power processor 212 may include one core. The low-power processor 212 may provide computation capability to the IS control instruction group 230.

The image data interface circuit unit 214 may provide communication with the camera unit 250, and the general-purpose interface circuit unit 215 may provide communication with peripheral devices of the electronic device 200.

The camera unit 250 may include a camera image sensor 251, a camera memory 252, and an IS driver 253.

The camera image sensor 251 may acquire an image by receiving light.

The camera image sensor 251 may be connected to the image data interface circuit unit 214 through a camera serial interface (CSI) channel to provide the acquired image to the general-purpose processor 211 through the image data interface circuit unit 214.

The camera memory 252 may store an IS adjustment value for calibrating the IS driver 253.

Upon receiving an IS result, the IS driver 253 may correct a shake of the camera unit 150 by physically adjusting at least one lens (not shown).

The motion sensor unit 260 may sense a motion and output motion information.

The motion sensor unit 260 may output the motion information through one communication channel (I3C interface).

More specifically, the motion sensor unit 260 may include a motion sensor 261, and a sensor data module 262.

The motion sensor 261 may be an element configured to sense the motion of the electronic device 200 and output the sensed motion information as sensor data, and may include a 6-axis sensor with a 3-axis gyroscope and a 3-axis accelerometer.

The sensor data module 262 may process the sensor data sensed by the motion sensor 261 into motion information and provide the motion information to the sensor interface circuit unit 213 of the low-power processor 212.

In this case, the motion information may be transmitted through an I3C interface connected between the sensor data module 262 and the sensor interface circuit unit 213. The motion information may be used as UI motion information or IS motion information, and may need to be additionally processed to be used as IS motion information.

The memory 220 may store an operating system for controlling the overall operation of the electronic device 200, application programs, and data for storage (e.g., phone numbers, SMS messages, compressed image files, videos, and the like). Further, the memory 220 may store the IS control instruction group 230 and a UI motion sensor instruction 240, using the general-purpose processor 211 according to the disclosure.

The low-power processor 212 may drive a polling timer to perform IS at a preset interval by executing an instruction included in the IS control instruction group 230, obtain the motion information, generate the IS result according to the motion information, and provide the IS result to the IS driver 253.

More specifically, the IS control instruction group 230 may include a polling timer instruction 231, a communication interface control instruction 232, an IS driving control instruction 233, an IS motion sensor control instruction 234, an IS sensor data processing instruction 235, and a sensor input/output data control instruction 236.

The polling timer instruction 231 may be an element configured to perform IS at a preset interval, and may be an instruction for verifying whether the preset interval expires in the polling timer in a case in which a camera is continuously turned on after a shake is corrected.

The polling timer instruction 231 may be an instruction for restarting the preset interval so that the IS control instruction group 230 may repeat correcting the shake, in a case in which the preset interval expires.

The polling timer instruction 231 may be an instruction for waiting for a preset time until the preset interval expires in a case in which the preset interval does not expire.

The communication interface control instruction 232 may be an instruction for connecting a first virtual communication interface between the memory 220 and the general-purpose processor 211 to receive an IS adjustment value. In this case, the first virtual communication interface may be a virtual communication interface mimicking the operation of an I2C interface.

In addition, the communication interface control instruction 232 may be an instruction for connecting a second virtual communication interface between the memory 220 and the general-purpose processor 211 to obtain information for setting an IS strength according to an ambient illumination using the general-purpose processor 211, in a case in which a video exclusive image quality correction mode is executed in a video shooting mode, verifying the IS strength based on the information for setting the IS strength, and providing the IS strength to the low-power processor 212 that executes the IS driving control instruction 233. In this case, the second virtual communication interface may be a virtual communication interface mimicking the operation of an I2C interface.

The IS motion sensor control instruction 234 may be an instruction for obtaining the motion information from the motion sensor unit 260 through the sensor interface circuit unit 213 of the low-power processor 212 using the low-power processor 212.

The IS sensor data processing instruction 235 may be an instruction for receiving, from the general-purpose processor 211, IS motion property setting information necessary for converting the motion information into IS motion information to be used for IS using the low-power processor 212, and processing the motion information into the IS motion information based on the IS motion property setting information.

The sensor input/output data control instruction 236 may be an instruction for controlling to defer obtainment of motion information with a low priority until transmission of motion information according to priority is completed, in a case in which a data collision is detected in obtaining the motion information based on the IS control instruction group, using the low-power processor 212. In this case, there may be a high possibility of a data collision in motion information in a case in which a camera is driven at the same time processing a UI with the motion information as in augmented reality or in a case in which IS of the camera is performed at the same time.

That is, the sensor input/output data control instruction 236 may be an instruction for controlling to defer obtainment of motion information with a low priority, in a case in which the IS motion sensor control instruction 234 and the UI motion sensor instruction 240 intend to obtain motion information at similar points in time (before another data request ends).

In this case, the priority may be set such that an element that intends to obtain (read) motion information first may have a higher priority. Since the IS motion sensor control instruction 234 requires motion information more quickly than the UI motion sensor instruction 240, the motion information requested by the IS motion sensor control instruction 234 may be set to have a higher priority in case of a data collision.

The IS sensor data processing instruction 235 may be an instruction for receiving, from the general-purpose processor 211, IS motion property setting information necessary for converting the motion information into IS motion information to be used for IS using the low-power processor 212, and processing the motion information into the IS motion information based on the IS motion property setting information.

The IS driving control instruction 233 may be an instruction for receiving the IS adjustment value stored in the camera unit 250 through the first virtual communication interface using the general-purpose processor 211, initializing IS based on the IS adjustment value using the low-power processor 212, generating the IS result corresponding to the IS motion information by executing an IS algorithm using the low-power processor 212, and providing the IS result to the IS driver 253 through the sensor interface circuit unit 213 using the low-power processor 212. The IS driving control instruction 233 may be to perform calibration using the IS adjustment value in a case in which executing the IS algorithm.

The IS driving control instruction 233 may be an instruction for generating the IS in consideration of the IS strength in generating the IS result, in a case in which a video exclusive image quality correction mode is executed in a video shooting mode.

Meanwhile, the IS control instruction group 230 is shown as being divided into the polling timer instruction 231, the communication interface control instruction 232, the IS driving control instruction 233, the IS motion sensor control instruction 234, the IS sensor data processing instruction 235, and the sensor input/output data control instruction 236 to describe their functions separately.

Hereinafter, a method according to the disclosure configured as described above will be described with reference to the drawings.

Figure 3:
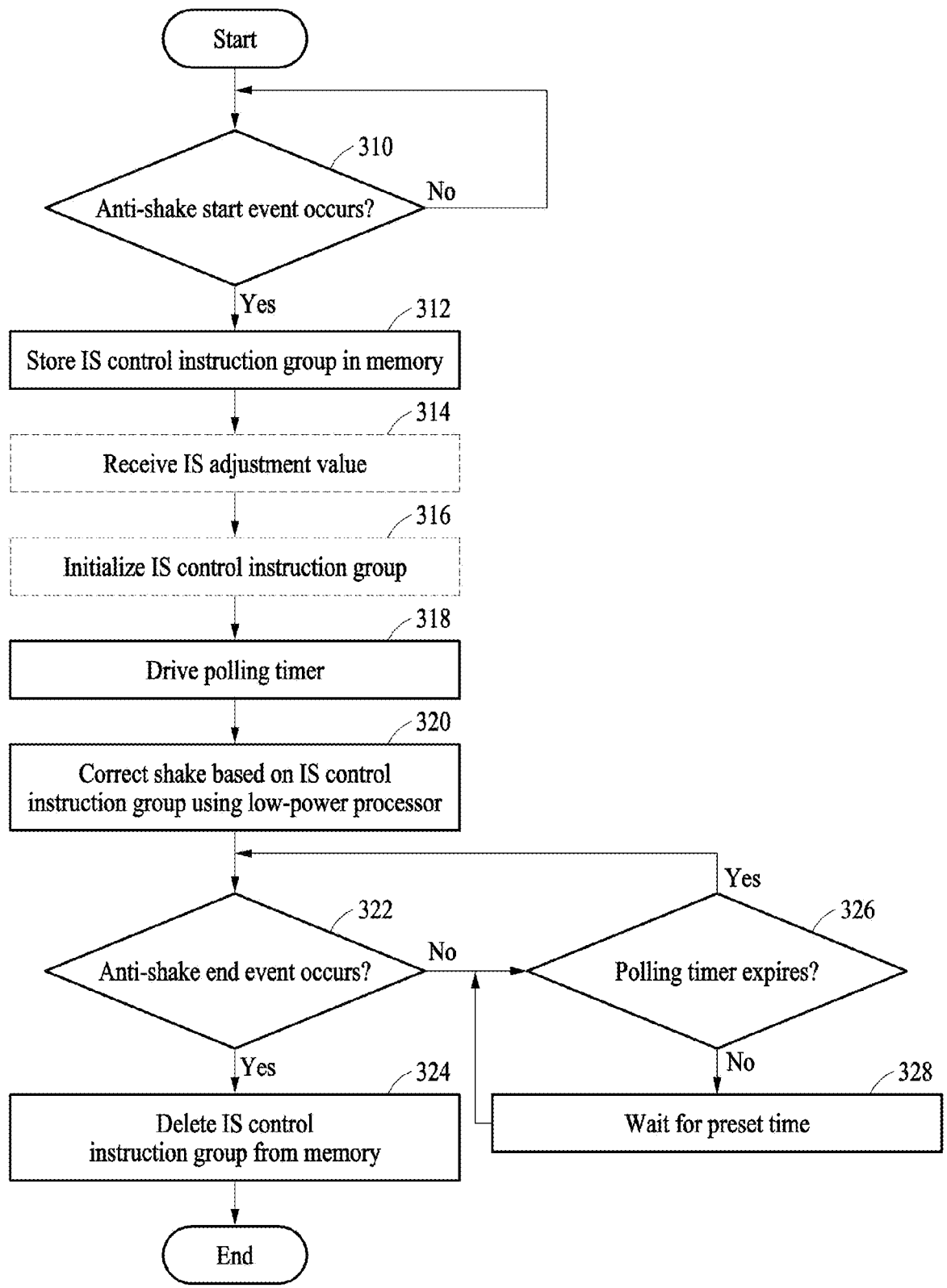
FIG. 3 is a flowchart illustrating a process of an electronic device controlling OIS of a camera according to an embodiment of the disclosure.

FIG. 3 is a flowchart illustrating a process of an electronic device controlling OIS of a camera according to an embodiment of the disclosure.

Referring to FIG. 3, in a case in which an anti-shake start event occurs in operation 310, the electronic device 100, 200 may store the IS control instruction group 130, 230 in the memory 120, 220, using the general-purpose processor 111, 211 in operation 312. In this case, the anti-shake start event may occur immediately before the camera unit 150, 250 operates as a camera app is executed. However, embodiments are not limited thereto, and the anti-shake start event may occur when the camera app is executed or when the camera unit 150, 250 starts to operate.

In operation 314, the electronic device 100, 200 may receive an IS adjustment value using the general-purpose processor 111, 211. Operation 314 of receiving the IS adjustment value will be further described later with reference to FIG. 4.

In operation 316, the electronic device 100, 200 may initialize the IS control instruction group 130, 230 based on the IS adjustment value using the low-power processor 112, 212.

As to the initialization in operation 316, the electronic device 100 of FIG. 1 and the electronic device 200 of FIG. 2 may operate differently.

In operation 316, the electronic device 100 of FIG. 1 may initialize the IS control instruction group based on the IS adjustment value using the low-power processor 112.

In operation 316, the electronic device 200 of FIG. 2 may initialize the IS control instruction group based on the IS adjustment value and IS motion property setting information using the low-power processor 212.

In this case, the IS motion property setting information may be information necessary for converting motion information sensed by the motion sensor unit 260 into IS motion information to be used for IS, and may be received using the general-purpose processor 211.

If initialization through calibration using the IS adjustment value is unnecessary, operations 314 and 316 may be omitted from the process of FIG. 3.

In operation 318, the electronic device 100, 200 may drive a polling timer to perform IS at a preset interval by executing the polling timer instruction 131, 231 included in the IS control instruction group 130, 230 using the low-power processor 112, 212.

In operation 320, the electronic device 100, 200 may correct a shake of the camera unit 150, 250 based on the IS control instruction group 130, 230 using the low-power processor 112 or 212.

In operation 322, the electronic device 100, 200 may verify whether an anti-shake end event occurs.

In this case, the anti-shake end event may occur immediately before the operation of the camera unit 150, 250 stops as the camera app ends. However, embodiments are not limited thereto, and the anti-shake end event may occur in a case in which the camera app ends or in a case in which the operation of the camera unit 150, 250 ceases.

In a case in which an anti-shake end event occurs according to the result of verifying in operation 322, the electronic device 100, 200 may delete the IS control instruction group 130, 230 from the memory 120, 220 using the general-purpose processor 111, 211, in operation 324.

In a case in which an anti-shake end event does not occur according to the result of verifying in operation 322, the electronic device 100, 200 may verify whether the preset interval of the polling timer expires using the low-power processor 112, 212, in operation 326.

In a case in which the preset interval expires according to the result of verifying in operation 326, the electronic device 100, 200 may return to operation 320 and repeat the series of operations of correcting a shake of the camera unit 150, 250 using the low-power processor 112, 212.

In a case in which the preset interval does not expire according to the result of verifying in operation 326, the electronic device 100, 200 may wait for a preset time until the preset interval of the polling timer expires using the low-power processor 112, 212, in operation 328.

Figure 4:
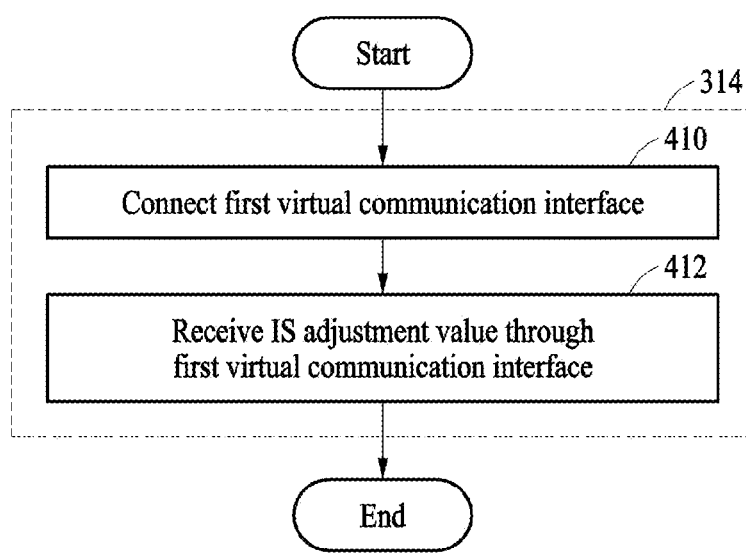
FIG. 4 is a flowchart illustrating a process of an electronic device receiving an IS adjustment value according to an embodiment of the disclosure.

FIG. 4 is a flowchart illustrating a process of an electronic device receiving an IS adjustment value according to an embodiment of the disclosure.

Referring to FIG. 4, in operation 410, the electronic device 100, 200 may connect a first virtual communication interface to the general-purpose processor 111, 211 to obtain an IS adjustment value to be used for calibration based on the IS control instruction group 130, 230 using the general-purpose processor 111, 211.

In operation 412, the electronic device 100, 200 may receive the IS adjustment value stored in the camera unit 150, 250 using the general-purpose processor 111, 211 and store the received IS adjustment value in the memory 120, 220 via the first virtual communication interface.

In this case, the first virtual communication interface may be a virtual communication interface mimicking the operation of an I2C interface.

As to operation 320 of correcting the shake of the camera unit 150, 250 in the process of providing IS of FIG. 3, the electronic device 100 of FIG. 1 and the electronic device 200 of FIG. 2 may operate differently.

An embodiment of the electronic device 100 of FIG. 1 performing operation 320 will be described below with reference to FIGS. 5 and 6, and an embodiment of the electronic device 200 of FIG. 2 performing operation 320 will be described below with reference to FIGS. 7 and 8.

Figure 5:
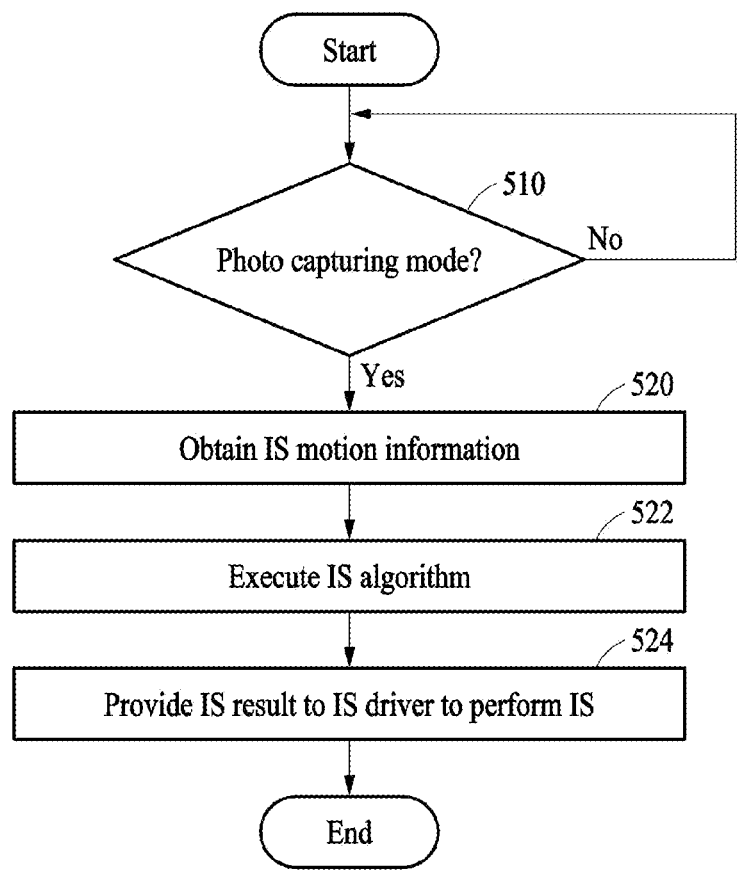
FIG. 5 is a flowchart illustrating a detailed process of an electronic device controlling OIS of a camera in a photo capturing mode when a motion sensor unit has two channels according to an embodiment of the disclosure.

FIG. 5 is a flowchart illustrating a detailed process of an electronic device controlling OIS of a camera in a photo capturing mode when a motion sensor unit has two channels according to an embodiment of the disclosure.

Referring to FIG. 5, in operation 510, the electronic device 100 may verify whether a mode of a camera is a photo capturing mode.

In a case in which the current mode of the camera is a photo capturing mode according to the result of verifying in operation 510, the electronic device 100 may obtain IS motion information from the motion sensor unit 160 through the sensor interface circuit unit 113 of the low-power processor 112 based on the IS control instruction group 130, using the low-power processor 112, in operation 520. The obtaining of the IS motion information in operation 520 may be performed in a manner of reading the IS motion information from the motion sensor unit 160 through the sensor interface circuit unit 113 at a preset interval (e.g., 1/6.6K sec) by the low-power processor 112.

In operation 522, the electronic device 100 may generate an IS result corresponding to the IS motion information by executing an IS algorithm based on the IS control instruction group 130, using the low-power processor 112.

In operation 524, the electronic device 100 may provide the IS result to the IS driver 153 included in the camera unit 150 through the sensor interface circuit unit 113 based on the IS control instruction group 130, using the low-power processor 112, such that the IS driver 153 may perform IS of the camera unit 150.

Figure 6:
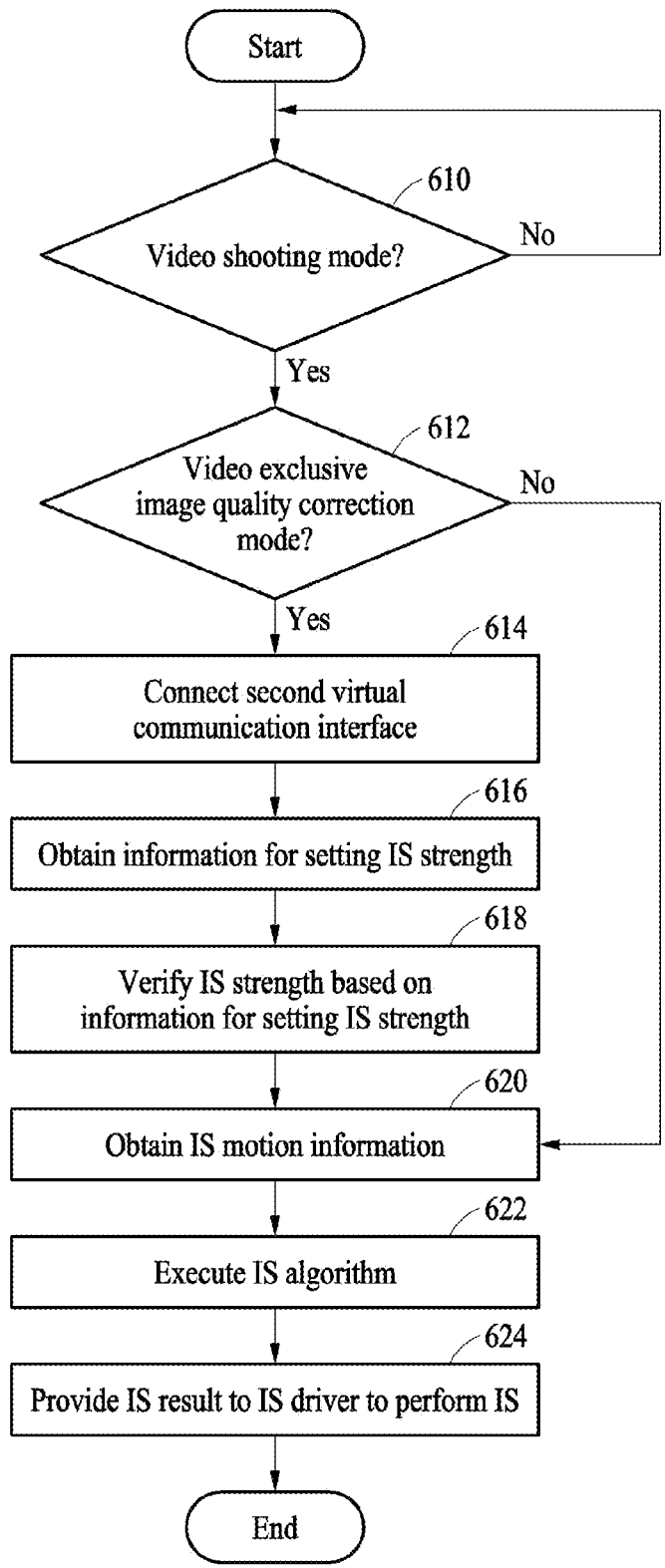
FIG. 6 is a flowchart illustrating a detailed process of an electronic device controlling OIS of a camera in a video shooting mode when a motion sensor unit has two channels according to an embodiment of the disclosure.

FIG. 6 is a flowchart illustrating a detailed process of an electronic device controlling OIS of a camera in a video shooting mode when a motion sensor unit has two channels according to an embodiment of the disclosure.

Referring to FIG. 6, in operation 610, the electronic device 100 may verify whether a mode of a camera is a video shooting mode.

In a case in which the current mode of the camera is a video shooting mode according to the result of verifying in operation 610, the electronic device 100 may verify whether the current video shooting mode is a video exclusive image quality correction mode, in operation 612.

In a case in which the current video shooting mode is a video exclusive image quality correction mode according to the result of verifying in operation 612, the electronic device 100 may connect a second virtual communication interface between the memory 120 and the general-purpose processor 111 based on the IS control instruction group 130 using the general-purpose processor 111, in operation 614.

In operation 616, the electronic device 100 may obtain information for setting an IS strength according to an ambient illumination from the general-purpose processor 111 through the second virtual communication interface based on the IS control instruction group 130 using the low-power processor 112.

In operation 618, the electronic device 100 may verify the IS strength to which the information for setting the IS strength is applied based on the IS control instruction group 130 using the low-power processor 112.

In operation 620, the electronic device 100 may obtain the IS motion information from the motion sensor unit 160 through the sensor interface circuit unit 113 of the low-power processor 112 based on the IS control instruction group 130, using the low-power processor 112. The obtaining of the IS motion information in operation 620 may be performed in a manner of reading the IS motion information from the motion sensor unit 160 through the sensor interface circuit unit 113 at a preset interval (e.g., 1/6.6K sec) by the low-power processor 112.

In operation 622, the electronic device 100 may generate an IS result corresponding to the IS motion information by executing an IS algorithm based on the IS control instruction group 130, using the low-power processor 112.

In operation 624, the electronic device 100 may provide the IS result to the IS driver 153 included in the camera unit 150 through the sensor interface circuit unit 113 based on the IS control instruction group 130, using the low-power processor 112, such that the IS driver 153 may perform IS of the camera unit 150.

In performing the IS algorithm in operation 624, the electronic device 100 may perform the IS algorithm in consideration of the IS strength verified in operation 618.

Meanwhile, in a case in which the current video shooting mode is not a video exclusive image quality correction mode according to the result of verifying in operation 612, the electronic device 100 may not consider the IS strength, but may perform operations 620 to 624.

Figure 7:
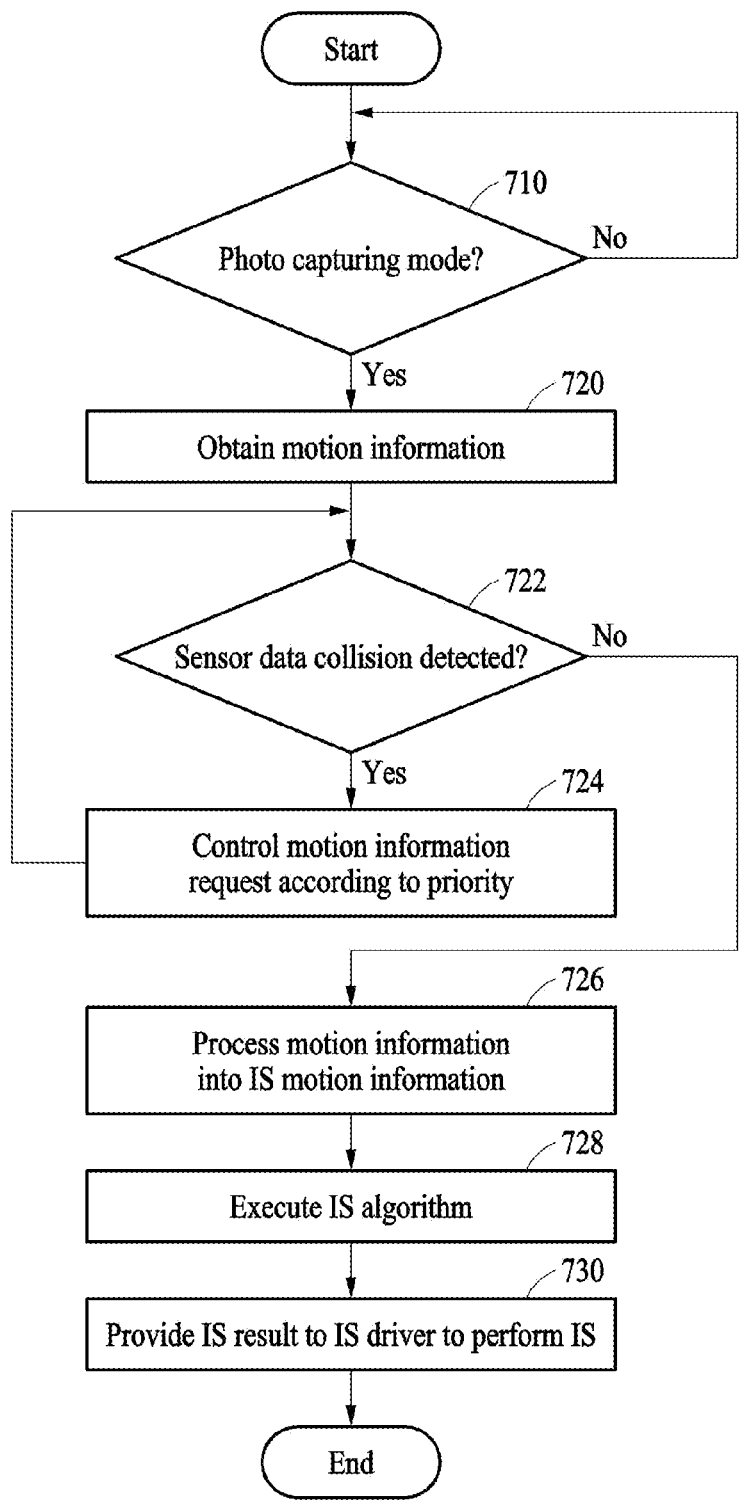
FIG. 7 is a flowchart illustrating a detailed process of an electronic device controlling OIS of a camera in a photo capturing mode when a motion sensor unit has one channel according to an embodiment of the disclosure.

FIG. 7 is a flowchart illustrating a detailed process of an electronic device controlling OIS of a camera in a photo capturing mode when a motion sensor unit has one channel according to an embodiment of the disclosure.

Referring to FIG. 7, in operation 710, the electronic device 200 may verify whether a mode of a camera is a photo capturing mode.

In a case in which the current mode of the camera is a photo capturing mode according to the result of verifying in operation 710, the electronic device 200 may obtain motion information from the motion sensor unit 260 through the sensor interface circuit unit 213 of the low-power processor 212 based on the IS control instruction group 230, using the low-power processor 212, in operation 720. The obtaining of the IS motion information in operation 720 may be performed in a manner of reading the IS motion information from the motion sensor unit 260 through the sensor interface circuit unit 213 at a preset interval (e.g., 1/6.6K sec) by the low-power processor 212.

In a case in which receiving the motion information in operation 720, the electronic device 200 may detect whether a data collision occurs in motion information due to another element (e.g., the UI motion sensor instruction 240), based on the IS control instruction group 230 using the low-power processor 212, in operation 722.

In a case in which a data collision is detected according to the result of verifying in operation 722, the electronic device 200 may control to defer obtainment of motion information with a low priority until transmission of motion information according to priority is completed, based on the IS control instruction group 230 using the low-power processor 212, in operation 724.

In a case in which a data collision is not detected according to the result of verifying in operation 722, the electronic device 200 may process the motion information into IS motion information to be used for IS based on the IS control instruction group 230, using the low-power processor 212, in operation 726.

In operation 728, the electronic device 200 may generate an IS result corresponding to the IS motion information by executing an IS algorithm based on the IS control instruction group 230, using the low-power processor 212.

In operation 730, the electronic device 200 may provide the IS result to the IS driver 253 included in the camera unit 250 through the sensor interface circuit unit 213 based on the IS control instruction group 230, using the low-power processor 212, such that the IS driver 253 may perform IS of the camera unit 250.

Figure 8:
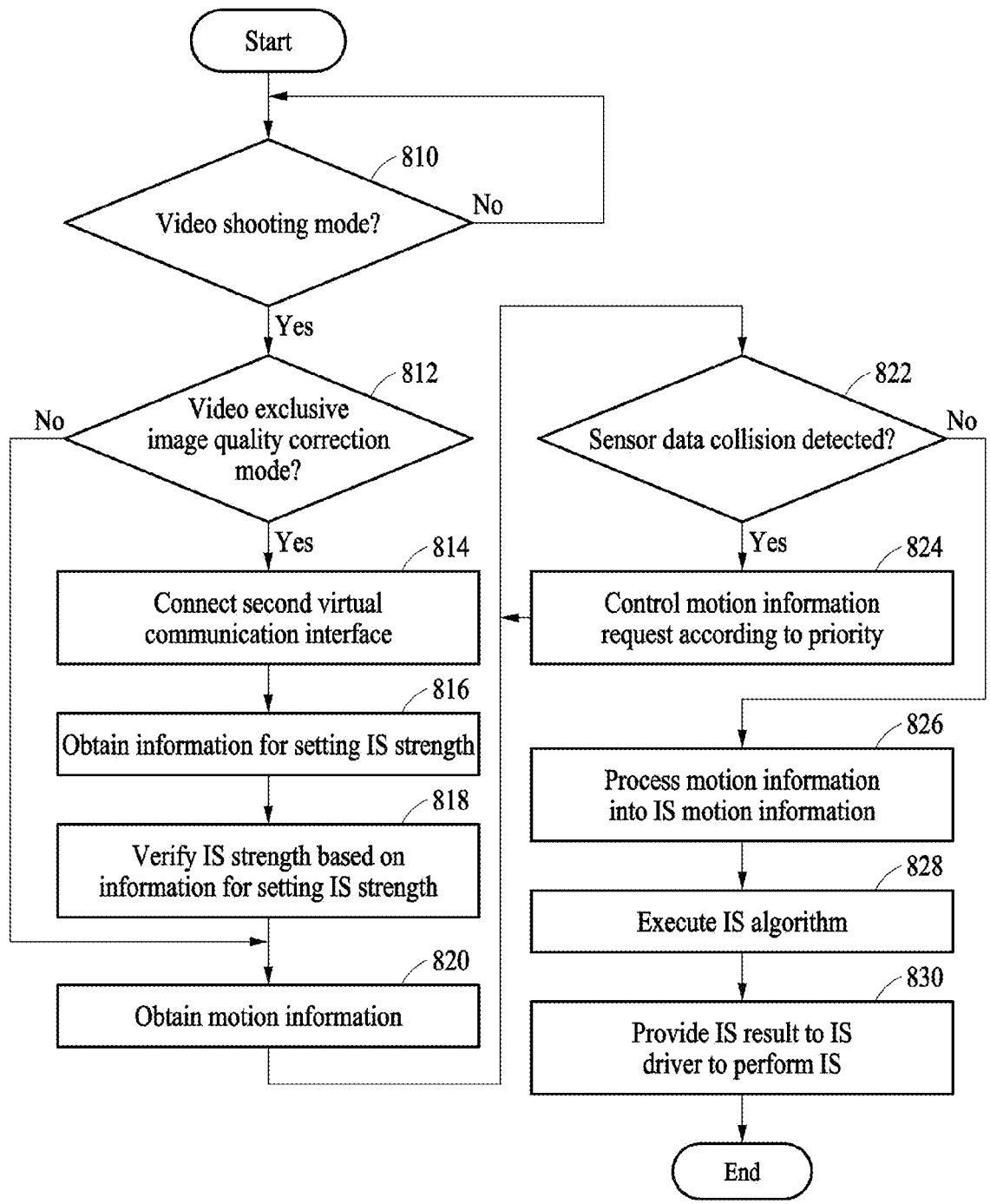
FIG. 8 is a flowchart illustrating a detailed process of an electronic device controlling OIS of a camera in a video shooting mode when a motion sensor unit has one channel according to an embodiment of the disclosure.

FIG. 8 is a flowchart illustrating a detailed process of an electronic device controlling OIS of a camera in a video shooting mode when a motion sensor unit has one channel according to an embodiment of the disclosure.

Referring to FIG. 8, in operation 810, the electronic device 200 may verify whether a mode of a camera is a video shooting mode.

In a case in which the current mode of the camera is a video shooting mode according to the result of verifying in operation 810, the electronic device 200 may verify whether the current video shooting mode is a video exclusive image quality correction mode, in operation 812.

In a case in which the current video shooting mode is a video exclusive image quality correction mode according to the result of verifying in operation 812, the electronic device 200 may connect a second virtual communication interface between the memory 220 and the general-purpose processor 211 based on the IS control instruction group 230 using the general-purpose processor 211, in operation 814.

In operation 816, the electronic device 200 may obtain information for setting an IS strength according to an ambient illumination from the general-purpose processor 211 through the second virtual communication interface based on the IS control instruction group 230 using the low-power processor 212.

In operation 818, the electronic device 200 may verify the IS strength to which the information for setting the IS strength is applied based on the IS control instruction group 230 using the low-power processor 212.

In operation 820, the electronic device 200 may obtain the motion information from the motion sensor unit 260 through the sensor interface circuit unit 213 of the low-power processor 212 based on the IS control instruction group 230, using the low-power processor 212. The obtaining of the IS motion information in operation 820 may be performed in a manner of reading the IS motion information from the motion sensor unit 260 through the sensor interface circuit unit 213 at a preset interval (e.g., 1/6.6K sec) by the low-power processor 212.

In a case in which receiving the motion information in operation 820, the electronic device 200 may detect whether a data collision occurs in motion information due to another element (e.g., the UI motion sensor instruction 240), based on the IS control instruction group 230 using the low-power processor 212, in operation 822.

In a case in which a data collision is detected according to the result of verifying in operation 822, the electronic device 200 may control to defer obtainment of motion information with a low priority until transmission of motion information according to priority is completed, based on the IS control instruction group 230 using the low-power processor 212, in operation 824.

In a case in which a data collision is not detected according to the result of verifying in operation 822, the electronic device 200 may process the motion information into IS motion information to be used for IS based on the IS control instruction group 230, using the low-power processor 212, in operation 826.

In operation 828, the electronic device 200 may generate an IS result corresponding to the IS motion information by executing an IS algorithm based on the IS control instruction group 230, using the low-power processor 212.

In operation 830, the electronic device 200 may provide the IS result to the IS driver 253 included in the camera unit 250 through the sensor interface circuit unit 213 based on the IS control instruction group 230, using the low-power processor 212, such that the IS driver 253 may perform IS of the camera unit 250.

In performing the IS algorithm in operation 828, the electronic device 200 may perform the IS algorithm in consideration of the IS strength verified in operation 818.

Meanwhile, in a case in which the current video shooting mode is not a video exclusive image quality correction mode according to the result of verifying in operation 812, the electronic device 200 may not consider the IS strength, but may perform operations 820 to 830.

Figure 9:
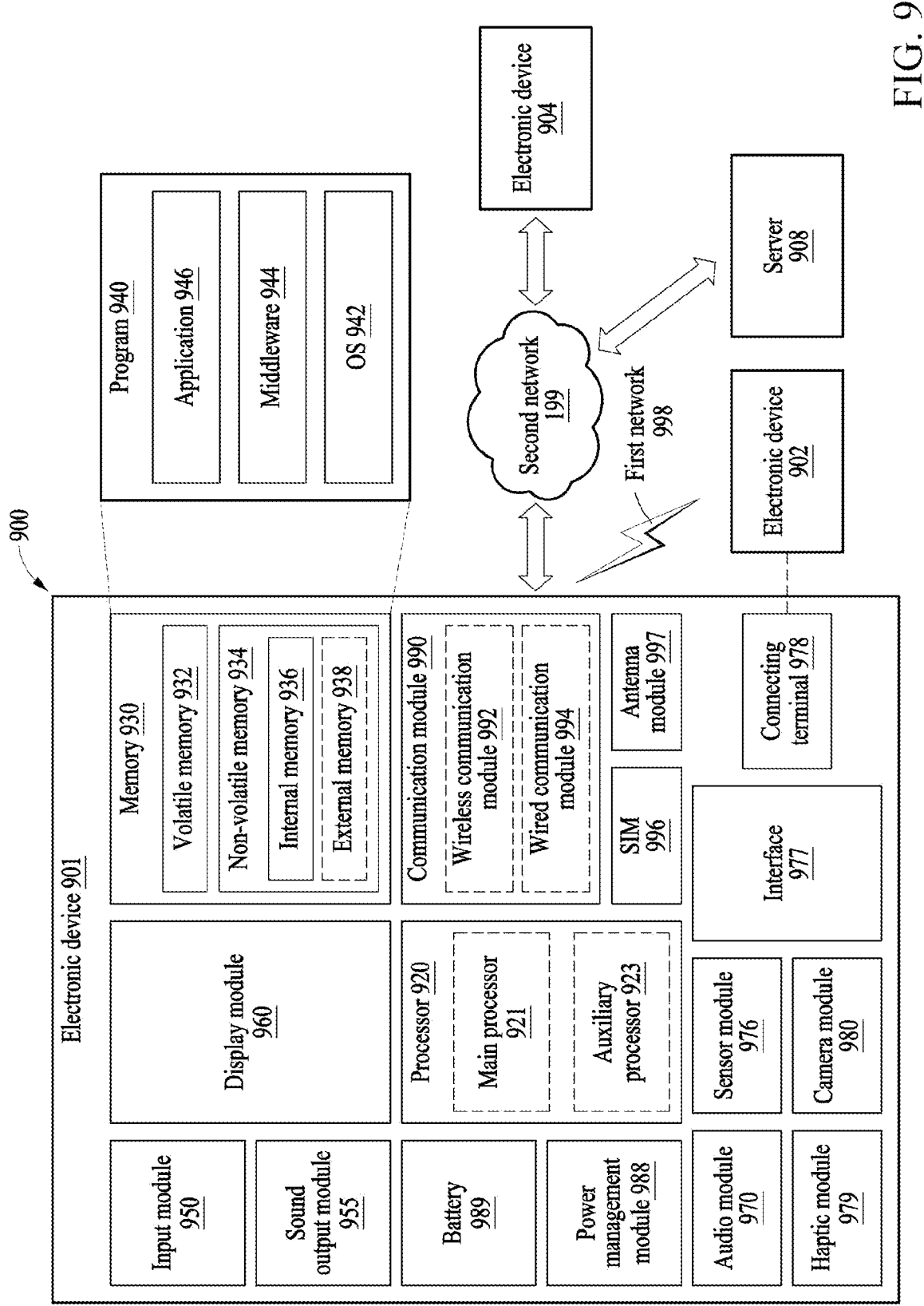
FIG. 9 is a block diagram illustrating an electronic device in a network environment according to an embodiment of the disclosure.

Meanwhile, the electronic device 100 of FIG. 1 or the electronic device 200 of FIG. 2 may be implemented in the form of an electronic device of FIG. 9.

FIG. 9 is a block diagram illustrating an electronic device 901 in a network environment 900 according to an embodiment of the disclosure.

Referring to FIG. 9, the electronic device 901 in the network environment 900 may communicate with an electronic device 902 via a first network 998 (e.g., a short-range wireless communication network), or communicate with at least one of an electronic device 904 or a server 908 via a second network 999 (e.g., a long-range wireless communication network). According to an embodiment, the electronic device 901 may communicate with the electronic device 904 via the server 908. According to another embodiment, the electronic device 901 may include a processor 920, a memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added to the electronic device 901. In some embodiments, some of the components (e.g., the sensor module 976, the camera module 980, or the antenna module 997) may be integrated as a single component (e.g., the display module 960).

The electronic device 901 may correspond to the electronic device 100 of FIG. 1 and the electronic device 200 of FIG. 2.

The processor 920 may correspond to the mobile processor 110 of FIG. 1 or the mobile processor 210 of FIG. 2.

The processor 920 may execute, for example, software (e.g., a program 940) to control at least one other component (e.g., a hardware or software component) of the electronic device 901 connected to the processor 920, and performs various data processing or computation. According to another embodiment, as at least a part of data processing or computation, the processor 920 may store a command or data received from another component (e.g., the sensor module 976 or the communication module 990) in a volatile memory 932, process the command or the data stored in the volatile memory 932, and store resulting data in a non-volatile memory 934. According to another embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with the main processor 921. For example, when the electronic device 901 includes the main processor 921 and the auxiliary processor 923, the auxiliary processor 923 is adapted to consume less power than the main processor 921 or to be specific to a specified function. The auxiliary processor 923 may be implemented separately from the main processor 921 or as a portion of the main processor 921.

The main processor 921 may correspond to the general-purpose processor 111 of FIG. 1 or the general-purpose processor 211 of FIGS. 1 and 2, and the auxiliary processor 923 may correspond to the low-power processor 112 of FIG. 1 or the low-power processor 212 of FIG. 2.

The auxiliary processor 923 may control at least some of functions or states related to at least one (e.g., the display module 960, the sensor module 976, or the communication module 990) of the components of the electronic device 901, instead of the main processor 921 while the main processor 921 is in an inactive (e.g., sleep) state or along with the main processor 921 while the main processor 921 is in an active state (e.g., executing an application). According to another embodiment, the auxiliary processor 923 (e.g., an ISP or a CP) may be implemented as a portion of another component (e.g., the camera module 980 or the communication module 990) that is functionally related to the auxiliary processor 923. According to another embodiment, the auxiliary processor 923 (e.g., an NPU) may include a hardware structure specified for artificial intelligence model processing. An artificial intelligence model may be generated by machine learning. Such learning may be performed by, for example, the electronic device 901 in which an artificial intelligence model is executed, or performed via a separate server (e.g., the server 908). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934. The non-volatile memory 934 may include an internal memory 936 and an external memory 938. The memory 930 may correspond to the memory 120 of FIG. 1 or the memory 220 of FIG. 2.

The program 940 may be stored as software in the memory 930, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output a sound signal to the outside of the electronic device 901. The sound output module 955 may include, for example, a speaker or a receiver. The speaker may be used for general purposes, such as playing multimedia or playing record. The receiver may be used to receive an incoming call. According to another embodiment, the receiver may be implemented separately from the speaker or as a part of the speaker.

The display module 960 may visually provide information to the outside (e.g., a user) of the electronic device 901. The display module 960 may include, for example, a control circuit for controlling a display, a hologram device, or a projector and control circuitry to control a corresponding one of the displays, the hologram device, and the projector. According to another embodiment, the display module 960 may include a touch sensor adapted to detect a touch, or a pressure sensor adapted to measure the intensity of force incurred by the touch.

The audio module 970 may convert a sound into an electrical signal or vice versa. According to another embodiment, the audio module 970 may obtain the sound via the input module 950 or output the sound via the sound output module 955 or an external electronic device (e.g., the electronic device 902 such as a speaker or a headphone) directly or wirelessly connected to the electronic device 901.

The sensor module 976 may detect an operational state (e.g., power or temperature) of the electronic device 901 or an environmental state (e.g., a state of a user) external to the electronic device 901, and generate an electrical signal or data value corresponding to the detected state. According to another embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The sensor module 976 may be configured to include the motion sensor unit 160 of FIG. 1 or the motion sensor unit 260 of FIG. 2.

The interface 977 may support one or more specified protocols to be used for the electronic device 901 to be coupled with the external electronic device (e.g., the electronic device 902) directly (e.g., wiredly) or wirelessly. According to another embodiment, the interface 977 may include, for example, a high-definition multimedia interface (HDMI), a universal serial bus (USB) interface, a secure digital (SD) card interface, or an audio interface.

The connecting terminal 978 may include a connector via which the electronic device 901 may be physically connected to an external electronic device (e.g., the electronic device 902). According to another embodiment, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via his or her tactile sensation or kinesthetic sensation. According to another embodiment, the haptic module 979 may include, for example, a motor, a piezoelectric element, or an electric stimulator.

The camera module 980 may take a still image and a video. According to another embodiment, the camera module 980 may include one or more lenses, image sensors, image signal processors, or flashes. The camera module 980 may be configured to include the camera unit 150 of FIG. 1 or the camera unit 250 of FIG. 2.

The power management module 988 may manage power supplied to the electronic device 901. According to another embodiment, the power management module 988 may be implemented as, for example, at least a part of a power management integrated circuit (PMIC).

The battery 989 may supply power to at least one component of the electronic device 901. According to another embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that operate independently of the processor 920 (e.g., an application processor) and support direct (e.g., wired) communication or wireless communication. According to another embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module, or a power line communication (PLC) module). A corresponding one of these communication modules may communicate with the external electronic device 904 via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a fifth generation (5G) network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the SIM 996.

The wireless communication module 992 may support a 5G network after a fourth generation (4G) network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., a millimeter wave (mmWave) band) to achieve, e.g., a high data transmission rate. The wireless communication module 992 may support various technologies for securing performance on a high-frequency band, such as, e.g., beamforming, massive multiple-input and multiple-output (MIMO), full dimensional MIMO (FD-MIMO), an array antenna, analog beam-forming, or a large-scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to another embodiment, the antenna module 997 may include an antenna including a radiating element including a conductive material or a conductive pattern formed in or on a substrate (e.g., a printed circuit board (PCB)). According to another embodiment, the antenna module 997 may include a plurality of antennas (e.g., array antennas). In such a case, at least one antenna appropriate for a communication scheme used in a communication network, such as the first network 998 or the second network 999, may be selected by, for example, the communication module 990 from the plurality of antennas. The signal or the power may be transmitted or received between the communication module 990 and the external electronic device via the at least one selected antenna. According to another embodiment, another component (e.g., a radio frequency integrated circuit (RFIC)) other than the radiating element may be additionally formed as a part of the antenna module 997.

According to another embodiment, the antenna module 997 may form an mmWave antenna module. According to another embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to another embodiment, commands or data may be transmitted or received between the electronic device 901 and the external electronic device 904 via the server 908 coupled with the second network 999. Each of the external electronic devices 902 and 904 may be a device of the same type as or a different type from the electronic device 901. According to another embodiment, all or some of operations to be executed by the electronic device 901 may be executed at one or more of the external electronic devices 902 and 904, and the server 908. For example, if the electronic device 901 needs to perform a function or a service automatically, or in response to a request from a user or another device, the electronic device 901, instead of, or in addition to, executing the function or the service, may request one or more external electronic devices to perform at least portion of the function or the service. The one or more external electronic devices receiving the request may perform the at least portion of the function or the service requested, or an additional function or an additional service related to the request, and may transfer an outcome of the performing to the electronic device 901. The electronic device 901 may provide the outcome, with or without further processing of the outcome, as at least portion of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an Internet-of-things (IoT) device. The server 908 may be an intelligent server using machine learning and/or a neural network. According to another embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

The disclosure relates to an apparatus and method for providing IS using a low-power processor that controls a sensor, instead of a separate IS processor, and may eliminate an IS processor that was provided separately in related arts, thereby securing physical space for the IS processor in the electronic device, reducing the waste of power necessary for driving the IS processor, and reducing the cost associated with providing the IS processor.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as compact disc read only memory (CD-ROM) discs, digital versatile discs (DVDs), and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Therefore, other implementations, other embodiments, and equivalents to the claims are also within the scope of the following claims.

According to another embodiment, an OIS method may include storing an IS control instruction group in a memory using a general-purpose processor when an anti-shake start event occurs, driving a polling timer to perform IS at a preset interval by executing a polling timer instruction included in the IS control instruction group using a low-power processor, and correcting a shake of a camera unit based on the IS control instruction group, using the low-power processor.

According to another embodiment, the OIS method may further include verifying whether the preset interval of the polling timer expires using the low-power processor when an anti-shake end event does not occur after correcting the shake of the camera unit, repeating the correcting of the shake of the camera unit using the low-power processor when the preset interval of the polling timer expires, and
  waiting for a preset time until the preset interval of the polling timer expires using the low-power processor, when the preset interval of the polling timer does not expire.

According to another embodiment, the OIS method may further include deleting the IS control instruction group from the memory using the general-purpose processor when an anti-shake end event occurs.

According to another embodiment, the OIS method may further include, before the driving of the polling timer, connecting a first virtual communication interface between the memory and the general-purpose processor to obtain an IS adjustment value using the general-purpose processor, receiving the IS adjustment value stored in the camera unit and storing the received IS adjustment value in the memory through the first virtual communication interface, using the general-purpose processor, and initializing the IS control instruction group based on the IS adjustment value using the low-power processor.

According to another embodiment, in the OIS method, the correcting of the shake of the camera unit based on the IS control instruction group may include obtaining IS motion information from a motion sensor unit through a sensor interface circuit unit of the low-power processor based on the IS control instruction group, using the low-power processor, generating an IS result corresponding to the IS motion information by executing an IS algorithm based on the IS control instruction group, using the low-power processor, and providing the IS result to an IS driver included in the camera unit through the sensor interface circuit unit based on the IS control instruction group, using the low-power processor.

According to another embodiment, in the OIS method, the correcting of the shake of the camera unit based on the IS control instruction group may further include connecting a second virtual communication interface between the memory and the general-purpose processor to obtain information for setting an IS strength according to an ambient illumination using the general-purpose processor, when a video exclusive image quality correction mode is executed in a video shooting mode, obtaining the information for setting the IS strength from the general-purpose processor through the second virtual communication interface based on the IS control instruction group, using the low-power processor, and verifying the IS strength to which the information for setting the IS strength is applied based on the IS control instruction group, using the low-power processor, wherein the generating of the IS result may include generating the IS result in consideration of the IS strength.

According to another embodiment, the OIS method may further include, before the driving of the polling timer, connecting a first virtual communication interface between the memory and the general-purpose processor to obtain an IS adjustment value using the general-purpose processor, receiving the IS adjustment value stored in the camera unit and storing the received IS adjustment value in the memory through the first virtual communication interface, using the general-purpose processor, receiving IS motion property setting information necessary for converting motion information sensed by a motion sensor unit into IS motion information to be used for IS using the general-purpose processor, and initializing the IS control instruction group based on the IS adjustment value and the IS motion property setting information using the low-power processor.

According to another embodiment, in the OIS method, the correcting of the shake of the camera unit based on the IS control instruction group may include obtaining motion information from a motion sensor unit through a sensor interface circuit unit of the low-power processor based on the IS control instruction group, using the low-power processor, processing the motion information into IS motion information to be used for IS based on the IS control instruction group, using the low-power processor, generating an IS result corresponding to the IS motion information by executing an IS algorithm based on the IS control instruction group, using the low-power processor, and providing the IS result to an IS driver included in the camera unit through the sensor interface circuit unit based on the IS control instruction group, using the low-power processor.

According to another embodiment, in the OIS method, the correcting of the shake of the camera unit based on the IS control instruction group may further include controlling to defer obtainment of motion information with a low priority until transmission of motion information according to priority is completed, when a data collision is detected in the obtaining of the motion information based on the IS control instruction group, using the low-power processor.

According to another embodiment, an OIS apparatus may include a camera unit including an IS driver configured to correct a shake according to an IS result, a motion sensor unit configured to sense a motion and output UI motion information and IS motion information, a memory, and a mobile processor including a general-purpose processor and a low-power processor, wherein the general-purpose processor may be configured to store an IS control instruction group in the memory when an anti-shake start event occurs, and the low-power processor may be configured to drive a polling timer to perform IS at a preset interval by executing an instruction included in the IS control instruction group stored in the memory, obtain the IS motion information, generate the IS result according to the IS motion information, and provide the IS result to the IS driver.

According to another embodiment, in the OIS apparatus, the IS control instruction group may include an IS motion sensor control instruction to obtain the IS motion information from the motion sensor unit through a sensor interface circuit unit of the low-power processor using the low-power processor, wherein the low-power processor may be configured to obtain the IS motion information from the motion sensor unit at least based on the IS motion sensor control instruction.

According to another embodiment, in the OIS apparatus, the IS control instruction group may include a polling timer instruction for driving the polling timer to perform IS at the preset interval using the low-power processor, wherein the low-power processor may be configured to verify whether the preset interval of the polling timer expires at least based on the polling timer instruction, when an anti-shake end event does not occur after correcting a shake, restart the preset interval of the polling timer when the preset interval expires, and wait for a preset time until the preset interval of the polling timer expires, when the preset interval does not expire.

According to another embodiment, in the OIS apparatus, the IS control instruction group may include a communication interface control instruction for connecting a first virtual communication interface between the memory and the general-purpose processor using the general-purpose processor, and an IS driving control instruction for receiving the IS adjustment value stored in the camera unit through the first virtual communication interface using the general-purpose processor, initializing IS based on the IS adjustment value using the low-power processor, generating the IS result corresponding to the IS motion information by executing an IS algorithm using the low-power processor, and providing the IS result to the IS driver through the sensor interface circuit unit using the low-power processor, wherein the general-purpose processor may be configured to connect a second virtual communication interface between the memory and the general-purpose processor to obtain information for setting an IS strength according to an ambient illumination at least based on the communication interface control instruction, when a video exclusive image quality correction mode is executed in a video shooting mode, verify the IS strength based on the information for setting the IS strength, and provide the IS strength to the low-power processor that executes the IS driving control instruction, and the low-power processor may be configured to consider the IS strength when generating the IS result, at least based on the IS driving control instruction.

According to another embodiment, in the OIS apparatus, the general-purpose processor may be configured to delete the IS control instruction group from the memory when an anti-shake end event occurs.

According to another embodiment, in the OIS apparatus, the motion sensor unit may be configured to output the UI motion information and the IS motion information through different communication channels.

According to another embodiment, an OIS apparatus may include a camera unit including an IS driver configured to correct a shake according to an IS result, a motion sensor configured to sense a motion and output motion information, a memory, and a mobile processor including a general-purpose processor and a low-power processor, the general-purpose processor may be configured to store an IS control instruction group in the memory when an anti-shake start event occurs, and the low-power processor may be configured to drive a polling timer to perform IS at a preset interval by executing an instruction included in the IS control instruction group stored in the memory, obtain the motion information, generate the IS result according to the motion information, and provide the IS result to the IS driver.

According to another embodiment, in the OIS apparatus, the IS control instruction group may include an IS sensor data processing instruction for receiving, from the general-purpose processor, IS motion property setting information necessary for converting the motion information into IS motion information to be used for IS and processing the motion information into the IS motion information based on the IS motion property setting information, using the low-power processor, wherein the low-power processor may be configured to receive the IS motion property setting information from the general-purpose processor at least based on the IS sensor data processing instruction, process the motion information into the IS motion information based on the IS motion property setting information, and generate the IS result according to the IS motion information.

According to another embodiment, in the OIS apparatus, the IS control instruction group may include a sensor input/output data control instruction for controlling to defer obtainment of motion information with a low priority until transmission of motion information according to priority is completed, when a data collision is detected in obtaining the motion information based on the IS control instruction group, using the low-power processor, wherein the low-power processor may be configured to defer obtainment of motion information with a low priority until transmission of motion information according to priority is completed based on the sensor input/output data control instruction, when a data collision is detected in obtaining the motion information.

According to another embodiment, in the OIS apparatus, the IS control instruction group may include a communication interface control instruction for connecting a first virtual communication interface between the memory and the general-purpose processor using the general-purpose processor, and an IS driving control instruction for receiving the IS adjustment value stored in the camera unit through the first virtual communication interface using the general-purpose processor, initializing IS based on the IS adjustment value using the low-power processor, generating the IS result corresponding to the motion information by executing an IS algorithm using the low-power processor, and providing the IS result to the IS driver through the sensor interface circuit unit using the low-power processor, wherein the general-purpose processor may be configured to connect a second virtual communication interface between the memory and the general-purpose processor to obtain information for setting an IS strength according to an ambient illumination at least based on the communication interface control instruction, when a video exclusive image quality correction mode is executed in a video shooting mode, verify the IS strength based on the information for setting the IS strength, and provide the IS strength to the low-power processor that executes the IS driving control instruction, and the low-power processor may be configured to consider the IS strength when generating the IS result, based on the IS driving control instruction.

According to another embodiment, in the OIS apparatus, the motion sensor unit may be configured to output the motion information through one communication channel.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An optical image stabilization (OIS) method, comprising:

storing an image stabilization (IS) control instruction group in a memory using a general-purpose processor in case that an anti-shake start event occurs;

driving a polling timer to perform IS at a preset interval by executing a polling timer instruction included in the IS control instruction group using a low-power processor;

correcting a shake of a camera based on the IS control instruction group, using the low-power processor;

verifying whether the preset interval of the polling timer expires using the low-power processor in case that an anti-shake end event does not occur after the correcting of the shake of the camera;

repeating the correcting of the shake of the camera using the low-power processor in case that the preset interval of the polling timer expires; and waiting for a preset time until the preset interval of the polling timer expires using the low-power processor, in case that the preset interval of the polling timer does not expire.

2. The OIS method of claim 1, further comprising:
deleting the IS control instruction group from the memory using the general-purpose processor in case that an anti-shake end event occurs.

3. The OIS method of claim 1, further comprising:
before the driving of the polling timer,
connecting a first virtual communication interface between the memory and the general-purpose processor to obtain an IS adjustment value using the general-purpose processor;
receiving the IS adjustment value stored in the camera and storing the received IS adjustment value in the memory through the first virtual communication interface, using the general-purpose processor; and
initializing the IS control instruction group based on the IS adjustment value using the low-power processor.

4. The OIS method of claim 1, wherein the correcting of the shake of the camera based on the IS control instruction group comprises:
obtaining IS motion information from a motion sensor through a sensor interface circuit of the low-power processor based on the IS control instruction group, using the low-power processor;
generating an IS result corresponding to the IS motion information by executing an IS algorithm based on the IS control instruction group, using the low-power processor; and
providing the IS result to an IS driver included in the camera through the sensor interface circuit based on the IS control instruction group, using the low-power processor.

5. The OIS method of claim 4,
wherein the correcting of the shake of the camera based on the IS control instruction group further comprises:
connecting a second virtual communication interface between the memory and the general-purpose processor to obtain information for setting an IS strength according to an ambient illumination using the general-purpose processor, in case that a video exclusive image quality correction mode is executed in a video shooting mode;
obtaining the information for setting the IS strength from the general-purpose processor through the second virtual communication interface based on the IS control instruction group, using the low-power processor; and verifying the IS strength to which the information for setting the IS strength is applied based on the IS control instruction group, using the low-power processor, and wherein the generating of the IS result comprises generating the IS result in consideration of the IS strength.

6. The OIS method of claim 1, further comprising:
before the driving of the polling timer,
connecting a first virtual communication interface between the memory and the general-purpose processor to obtain an IS adjustment value using the general-purpose processor;
receiving the IS adjustment value stored in the camera and storing the received IS adjustment value in the memory through the first virtual communication interface, using the general-purpose processor;
receiving IS motion property setting information necessary for converting motion information sensed by a motion sensor into IS motion information to be used for IS using the general-purpose processor; and
initializing the IS control instruction group based on the IS adjustment value and the IS motion property setting information using the low-power processor.

7. The OIS method of claim 1, wherein the correcting of the shake of the camera based on the IS control instruction group comprises:
obtaining motion information from a motion sensor unit through a sensor interface circuit of the low-power processor based on the IS control instruction group, using the low-power processor;
processing the motion information into IS motion information to be used for IS based on the IS control instruction group, using the low-power processor;
generating an IS result corresponding to the IS motion information by executing an IS algorithm based on the IS control instruction group, using the low-power processor; and
providing the IS result to an IS driver included in the camera through the sensor interface circuit based on the IS control instruction group, using the low-power processor.

8. The OIS method of claim 7, wherein the correcting of the shake of the camera based on the IS control instruction group further comprises controlling to defer obtainment of motion information with a low priority until transmission of motion information according to priority is completed, in case that a data collision is detected in the obtaining of the motion information based on the IS control instruction group, using the low-power processor.

9. An optical image stabilization (OIS) apparatus, comprising:
a camera comprising an image stabilization (IS) driver configured to correct a shake according to an IS result;
a motion sensor configured to sense a motion and output user interface (UI) motion information and IS motion information;
a memory; and
a mobile processor comprising a general-purpose processor and a low-power processor,
wherein the general-purpose processor is configured to store an IS control instruction group in the memory in case that an anti-shake start event occurs, and
wherein the low-power processor is configured to:
drive a polling timer to perform IS at a preset interval by executing an instruction included in the IS control instruction group stored in the memory,
obtain the IS motion information, generate the IS result according to the IS motion information, and
provide the IS result to the IS driver,
wherein the IS control instruction group comprises a polling timer instruction for driving the polling timer to perform IS at the preset interval using the low-power processor, and
wherein the low-power processor is further configured to:
verify whether the preset interval of the polling timer expires at least based on the polling timer instruction, in case that an anti-shake end event does not occur after correcting a shake,
restart the preset interval of the polling timer in case that the preset interval expires, and
wait for a preset time until the preset interval of the polling timer expires, in case that the preset interval does not expire.

10. The OIS apparatus of claim 9,
wherein the IS control instruction group comprises an IS motion sensor control instruction to obtain the IS motion information from the motion sensor through a sensor interface circuit of the low-power processor using the low-power processor, and
wherein the low-power processor is further configured to obtain the IS motion information from the motion sensor at least based on the IS motion sensor control instruction.

11. The OIS apparatus of claim 9,
wherein the IS control instruction group comprises:
a communication interface control instruction for connecting a first virtual communication interface between the memory and the general-purpose processor using the general-purpose processor,
an IS driving control instruction for receiving an IS adjustment value stored in the camera through the first virtual communication interface using the general-purpose processor,
initializing IS based on the IS adjustment value using the low-power processor,
generating the IS result corresponding to the IS motion information by executing an IS algorithm using the low-power processor, and
providing the IS result to the IS driver through a sensor interface circuit using the low-power processor,
wherein the general-purpose processor is further configured to:
connect a second virtual communication interface between the memory and the general-purpose processor to obtain information for setting an IS strength according to an ambient illumination at least based on the communication interface control instruction, in case that a video exclusive image quality correction mode is executed in a video shooting mode,
verify the IS strength based on the information for setting the IS strength, and
provide the IS strength to the low-power processor that executes the IS driving control instruction, and
wherein the low-power processor is further configured to consider the IS strength in case that generating the IS result, at least based on the IS driving control instruction.

12. The OIS apparatus of claim 9, wherein the general-purpose processor is further configured to delete the IS control instruction group from the memory in case that an anti-shake end event occurs.

13. The OIS apparatus of claim 9, wherein the motion sensor is further configured to output the UI motion information and the IS motion information through different communication channels.

14. An optical image stabilization (OIS) apparatus, comprising:
a camera comprising an image stabilization (IS) driver configured to correct a shake according to an IS result;
a motion sensor configured to sense a motion and output motion information;
a memory; and
a mobile processor comprising a general-purpose processor and a low-power processor,
wherein the general-purpose processor is configured to store an IS control instruction group in the memory in case that an anti-shake start event occurs, and
wherein the low-power processor is configured to:
drive a polling timer to perform IS at a preset interval by executing an instruction included in the IS control instruction group stored in the memory,
obtain the motion information, generate the IS result according to the motion information, and
provide the IS result to the IS driver,
wherein the IS control instruction group comprises a polling timer instruction for driving the polling timer to perform IS at the preset interval using the low-power processor, and
wherein the low-power processor is further configured to:
verify whether the preset interval of the polling timer expires at least based on the polling timer instruction, in case that an anti-shake end event does not occur after correcting a shake,
restart the preset interval of the polling timer in case that the preset interval expires, and
wait for a preset time until the preset interval of the polling timer expires, in case that the preset interval does not expire.

15. The OIS apparatus of claim 14,
wherein the IS control instruction group comprises:
an IS sensor data processing instruction for receiving, from the general-purpose processor,
IS motion property setting information necessary for converting the motion information into IS motion information to be used for IS, and
processing the motion information into the IS motion information based on the IS motion property setting information, using the low-power processor, and
wherein the low-power processor is further configured to:
receive the IS motion property setting information from the general-purpose processor at least based on the IS sensor data processing instruction,
process the motion information into the IS motion information based on the IS motion property setting information, and
generate the IS result according to the IS motion information.

16. The OIS apparatus of claim 14,
wherein the IS control instruction group comprises a sensor input/output data control instruction for controlling to defer obtainment of motion information with a low priority until transmission of motion information according to priority is completed, in case that a data collision is detected in obtaining the motion information based on the IS control instruction group, using the low-power processor, and
wherein the low-power processor is further configured to defer obtainment of motion information with a low priority until transmission of motion information according to priority is completed based on the sensor input/output data control instruction, in case that a data collision is detected in obtaining the motion information.

17. The OIS apparatus of claim 14,
wherein the IS control instruction group comprises:
a communication interface control instruction for connecting a first virtual communication interface between the memory and the general-purpose processor using the general-purpose processor,
an IS driving control instruction for receiving an IS adjustment value stored in the camera through the first virtual communication interface using the general-purpose processor,
initializing IS based on the IS adjustment value using the low-power processor,
generating the IS result corresponding to the motion information by executing an IS algorithm using the low-power processor, and
providing the IS result to the IS driver through a sensor interface circuit in case that using the low-power processor,
wherein the general-purpose processor is configured to:
connect a second virtual communication interface between the memory and the general-purpose processor to obtain information for setting an IS strength according to an ambient illumination at least based on the communication interface control instruction, in case that a video exclusive image quality correction mode is executed in a video shooting mode,
verify the IS strength based on the information for setting the IS strength, and
provide the IS strength to the low-power processor that executes the IS driving control instruction, and
wherein the low-power processor is configured to consider the IS strength in case that generating the IS result, based on the IS driving control instruction.

18. The OIS apparatus of claim 14, wherein the motion sensor is configured to output the motion information through one communication channel.

19. The OIS apparatus of claim 17, wherein the IS control instruction group is initialized group based on the IS adjustment value and IS motion property setting information using the low-power processor.

20. The OIS apparatus of claim 19, wherein the IS motion property setting information is information necessary that converts motion information detected by the motion sensor into the IS motion information to be used for IS, and is received using the general-purpose processor.

21. The OIS apparatus of claim 17, wherein the first virtual communication interface is a virtual communication interface mimicking an operation of an inter-integrated circuit (I2C) interface.

* * * * *